United States Patent

Mota Lopez et al.

[11] Patent Number: 6,089,620
[45] Date of Patent: Jul. 18, 2000

[54] RAPID CONNECTION AND DISCONNECTION DEVICE FOR ELECTROPUMPS AND CONDUITS FOR MOTOR VEHICLE WIND-SHIELD WASHING SYSTEMS

[75] Inventors: Miguel Mota Lopez; Juan Elvira Peralta, both of Rubi, Spain

[73] Assignee: Fico Transpar, S.A., Barcelona, Spain

[21] Appl. No.: 09/202,292

[22] PCT Filed: Jun. 27, 1997

[86] PCT No.: PCT/ES97/00165

§ 371 Date: Dec. 11, 1998

§ 102(e) Date: Dec. 11, 1998

[87] PCT Pub. No.: WO98/03814

PCT Pub. Date: Jan. 29, 1998

[30] Foreign Application Priority Data

Jul. 19, 1996 [ES] Spain ........................................ 9601610

[51] Int. Cl.[7] ................................................ F16L 33/22
[52] U.S. Cl. .................... 285/322; 285/319; 285/322; 285/331
[58] Field of Search ................... 285/319, 331, 285/332, 315, 322

[56] References Cited

U.S. PATENT DOCUMENTS

| | | | |
|---|---|---|---|
| 3,628,812 | 12/1971 | Larralde | 285/315 |
| 3,724,882 | 4/1973 | Dehar . | |
| 4,026,581 | 5/1977 | Pasbrig | 285/331 |
| 4,293,149 | 10/1981 | Bonel . | |
| 4,451,069 | 5/1984 | Melone | 285/315 |
| 4,508,374 | 4/1985 | Kantor . | |
| 4,993,755 | 2/1991 | Johnston | 285/322 |
| 5,240,289 | 8/1993 | Goettling et al. . | |
| 5,921,588 | 7/1999 | Vogel | 285/322 |
| 5,984,265 | 11/1999 | Engdahl | 285/315 |

FOREIGN PATENT DOCUMENTS

| | | |
|---|---|---|
| 0 240 832 | 10/1987 | European Pat. Off. . |
| 2 080 209 | 11/1971 | France . |
| 0378035 | 7/1990 | France ........................ 285/315 |
| 26 11 233 | 9/1977 | Germany . |

*Primary Examiner*—Lynne H. Browne
*Assistant Examiner*—Aaron Dunwoody
*Attorney, Agent, or Firm*—Michael J. Striker

[57] ABSTRACT

A quick connection and disconnection device for the electrical pumps and tubes of automobile vehicle wind screen washer installations, comprising a nozzle body and a connecting body each having an axial passage and arranged coaxially relative to one another, the nozzle body and the connecting body being slidable longitudinally in both directions relative to one another so that the connecting body has a first working position or disconnection position in which at least one end of a flexible tube passing through the axial passage of the connecting body fits into the axial passage of the nozzle body, and a second working position or a connection position in which the one end of the flexible tube is attached securely to the nozzle body, the nozzle body being provided on an exterior with a connection groove and a disconnection groove which are separated by a wall of a convex-curved outline, the connecting body at one end being provided with a plurality of longitudinal grooves which starting from an edge of the one end form attachment arms provided internally with attachment projections adapted to be housed with a snug fit in the connection groove or in the disconnection groove of the nozzle body, so that a passage of the connecting body from the disconnection position to the connection position and vice versa, is carried out by a double elastic deformation of the attachment arms.

7 Claims, 2 Drawing Sheets

RAPID CONNECTION AND DISCONNECTION DEVICE FOR ELECTROPUMPS AND CONDUITS FOR MOTOR VEHICLE WIND-SHIELD WASHING SYSTEMS

TECHNICAL FIELD OF THE INVENTION

The object of the invention is a quick connection and disconnection device for electric pumps and tubes of automobile vehicle windscreen washer installations. In particular, the device of the invention is applicable to the outlet nozzle of windscreen washer electric pumps and any other of the elements habitually used in automobile vehicle windscreen washer installations such as attachment and tap-off accessories, jets, etc.

BACKGROUND OF THE INVENTION

As is known, washing of the glazed surfaces of automobile vehicles is carried out using factory-fitted means which generally include a cleaning liquid reservoir, an electric pump generally attached to said reservoir, and a plurality of flexible tubes which link said electric pump with jets which project the cleaning liquid against the glazed surfaces at the pressure and flow required in each particular case.

The electric pump essentially comprises a sucking and forcing pump made up of an forcing chamber in which is fitted a sucking and forcing turbine, with input of cleaning liquid to the forcing chamber being implemented by means of an axial sucking extension and output of cleaning liquid from said chamber being implemented through an outlet nozzle tangentially mounted with respect to same. In general, the outlet nozzle has its free end designed to receive a corresponding end of flexible tube, said design arrangement consisting in a truncated-end termination in which the larger base forms a perimetric projection, with connection under pressure of said end of tube to the outlet nozzle, in such a way that by elastic reaction of the tube material said end presses an the exterior surface of the outlet nozzle to lend the connection a certain leaktightness.

The mode of flexible tube connection described above has the following main disadvantages. The location of the electric pump and accessibility to same are frequently a considerable hindrance to implementation of connection or disconnection of the tube, which increases the cost of both the windscreen washer installation and its maintenance. Moreover, the insertion under pressure of the outlet nozzle into the tube generally calls for the use of lubricating materials such as greases applied onto the nozzle, which under certain circumstances, such as when too much of said lubricants is applied, can lead to blockage of the tube, preventing free circulation of cleaning liquid.

The situation described above with respect to connection of a flexible tube to the outlet nozzle of an electric pump is by extension entirely applicable to connection of a tube of this type to a cleaning liquid inlet or outlet nozzle of any of the elements habitually used in windscreen washer installations, such as attachment and/or tap-off elements and jets.

EXPLANATION OF THE INVENTION

A quick connection and disconnection device of new structure and operation for electric pumps and tubes of automobile vehicle windscreen washer installations is made known herein in order to provide a solution to the above-described disadvantages generally presented in connection and disconnection of flexible tubes to and from nozzles.

The quick connection and disconnection device of the invention includes a nozzle body and a connecting body coaxially mounted and permanently attached and capable of sliding longitudinally in both directions one with respect to the other, with both bodies having a respective axial passage, respective and complementary attachment means so designed that the connecting body has two working positions, a first position or disconnection position in which one end of flexible tube, traversing the axial passage of the connecting body, fits into the axial passage of the nozzle body, and a second position, or connection position, in which said end of tube is attached securely to the nozzle and connecting bodies by the action of fixing means which both bodies have respectively and in complementary fashion, while the nozzle body has leaktightness means which, once said tube end has been connected, are destined to prevent leakage of cleaning liquid.

The fast connection and disconnection device of the invention is characterized in that the attachment means include in the nozzle body and externally, two perimetral linking grooves, for connection and disconnection respectively, separated by a wall of convex-curved outline, and at one end of the connecting body, a plurality of longitudinal grooves which, starting from the edge of said end, form attaching arms having to their interior attachment projections designed to be housed with a snug fit in the connecting or disconnecting groove, all being adapted in such a way that the passage of the connecting body from the disconnection position to the connection position, and vice-versa, is carried out by means of a double elastic deformation of the attachement arms.

According to another characteristic of the quick connection and disconnection device of the invention, the fixing means include, in the axial passage of the nozzle body, a first cylindrical portion or interior portion whose diameter coincides with that of the interior of said end of flexible tube, a second intermediate cylindrical portion of larger diameter than that of the interior portion which attaches to it and forming a seat on which said end of tube can rest, a third intermediate truncated-cone portion whose smaller base attaches to said second portion, and a fourth cylindrical portion which attaches to the larger base of said third truncated-cone portion to form an opening mouth, and on the connecting body, interior and tangentially mounted with respect to its axial passage, a plurality of fixing arms which are the same as each other and regularly distributed and have in the interior of their free ends a fixing projection, all being adapted in such a way that, during the passage of the connecting body from the disconnection position to the connection position, and vice-versa, a simple elastic deformation of the fixing arms is produced upon their sliding over the truncated-cone portion of the nozzle body.

According to another characteristic of the quick connection and disconnection device of the invention, the leaktightness means include, on the nozzle body and on the second intermediate cylindrical portion, of the axial passage, a perimetric groove on which there is a leaktightness seal.

According to another characteristic of the quick connection and disconnection device of the invention, at least one of the attaching arms of the connecting body has a handgrip projection.

According to another characteristic of the quick connection and disconnection device of the invention, the nozzle body includes a tubular axial extension which is tangentially linked hydraulically with the forcing chamber of an electric sucking and forcing pump.

According to another characteristic of the fast connection and disconnection device of the invention, the nozzle body includes a tubular axial extension by which it is attached to another nozzle body in such a way as to permit the hydraulic connection of two ends of respective flexible tubes.

According to another characteristic of the quick connection and disconnection device of the invention, the nozzle body includes a tubular axial extension which attaches to a jet body to establish hydraulic communication with the jet projecting means.

The functioning of the device of the invention whose characteristics have been described is of extraordinary simplicity and is described below. The device is supplied ex-works with the connecting body attached to the nozzle body and occupying the disconnection position, in which position the attachment projections of the attachment arms are in the disconnection attaching groove of the nozzle body, thereby preventing any accidental separation of the two bodies. In this situation, the user has simply to insert the end of a flexible tube through the axial passage of the connecting body until said end rests on the seat formed by attachment of the first and second portions of the axial passage of the nozzle body, and then move the connecting body from the disconnection position to the connection position by making the fixing arms slide on the truncated-cone portion of the axial passage of the nozzle body, this sliding causing an elastic deformation of the fixing arms which, by drawing towards each other, press by means of their fixing projections on the tube and fix its position; there arises simultaneously a double elastic deformation of the attaching arms of the connecting body, in such a way that the attaching projections go into the attaching groove and fix the position of the attaching body. Disconnection of the tube end simply requires movement of the connecting body from the connection to the disconnection position and, by elastic reaction of the fixing arms sliding on said truncated-cone portion, causes the return to their initial position of said fixing arms whose fixing projections cease to exercise pressure on the tube end, which is released and so can be withdrawn easily from the device through the axial passage of the connecting body; there arises simultaneously a double elastic deformation of the attaching arms, leaving their attaching projections in the disconnection attaching groove in such a way that the quick connection and disconnection device of the invention is left in the initial position described above.

BRIEF DESCRIPTION OF THE DRAWINGS

The drawing sheets of the present specification show the quick connection and disconnection device of the invention for electric pumps and tubes of automobile vehicle windscreen washer installations. In said drawings.

DETAILED DESCRIPTION OF THE EXAMPLE OF EMBODIMENT

Figure 1:
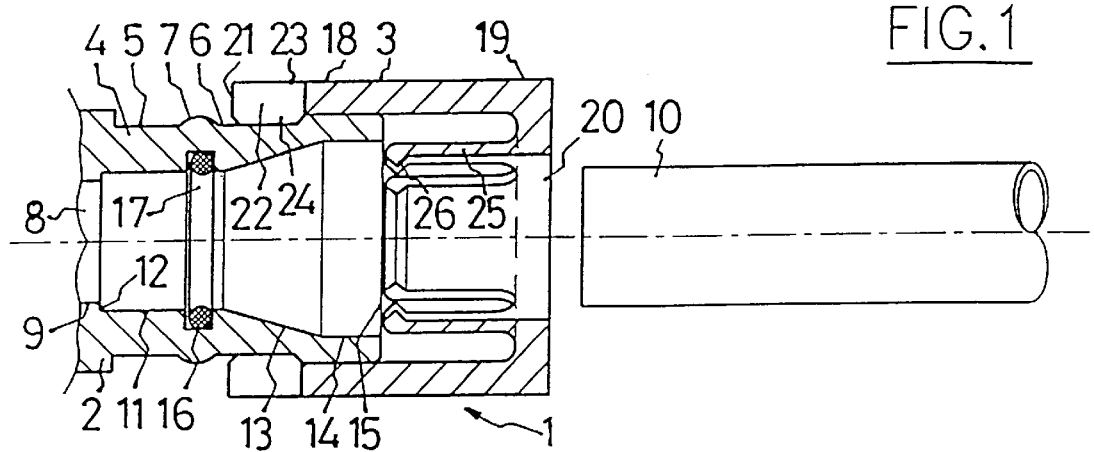
FIG. 1 is a longitudinal section view which shows the device of the invention as supplied ex-works.
Figure 2:
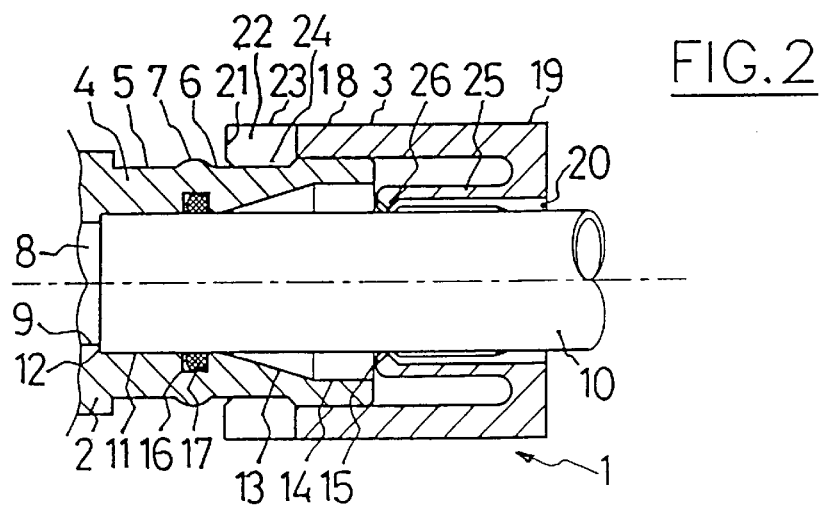
FIG. 2 is a longitudinal section view of the device of the invention with one end of flexible tube fitted inside it prior to fixing of same.
Figure 3:
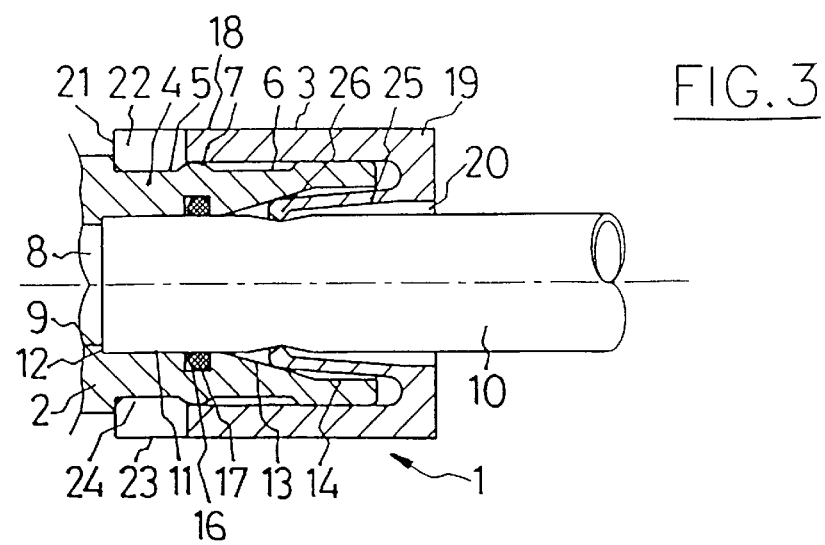
FIG. 3 is a longitudinal section view of the device of the invention with the attaching body in the connection position fixing one end of flexible tube.
Figure 4:
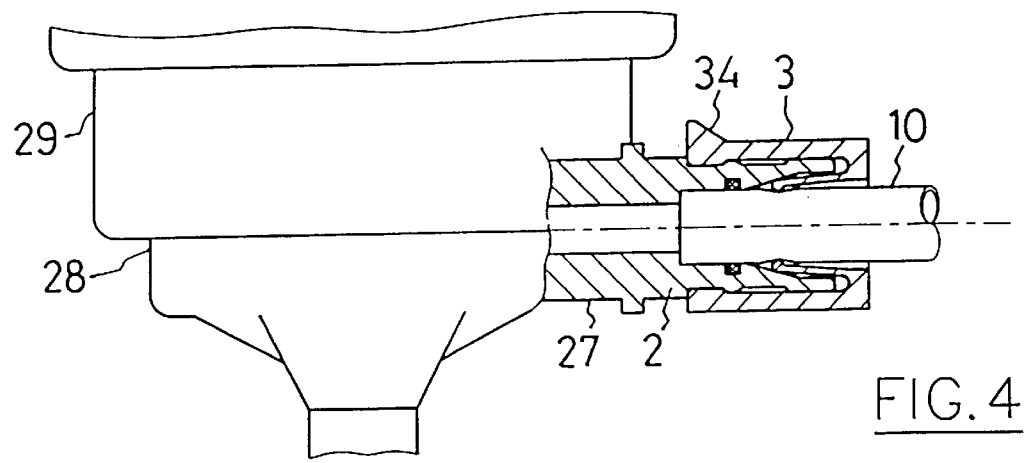
FIG. 4 shows a mode of embodiment of the device of the invention applied to an electric sucking and forcing pump.
Figure 5:
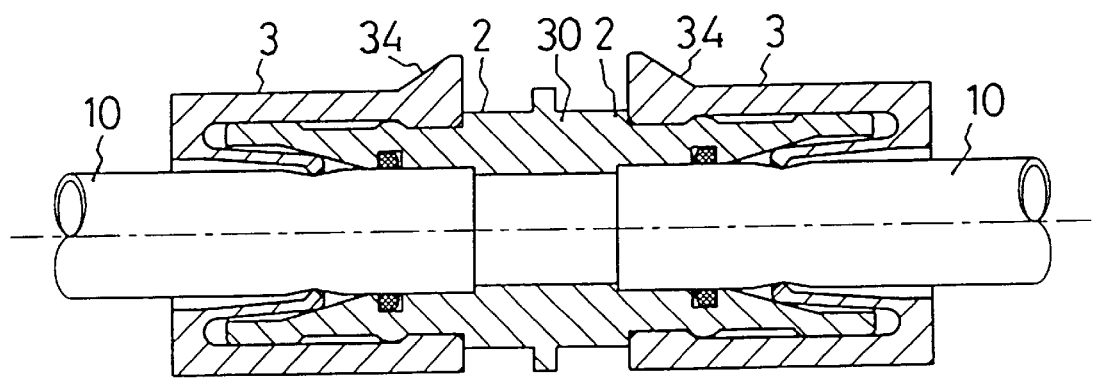
FIG. 5 shows another mode of embodiment of the device of the invention as attachment element for two flexible tube ends.
Figure 6:
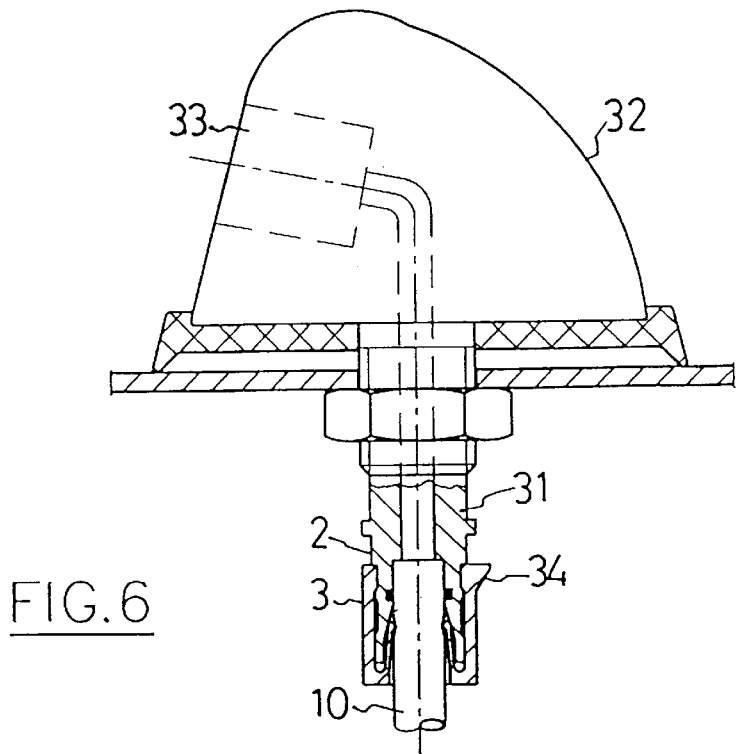
FIG. 6 shows another mode of embodiment of the device of the invention applied to a jet.

The description which follows of the quick connection and disconnection device of the invention for electric pumps and tubes of automobile vehicle windscreen washer installations refers to the mode of embodiment shown in FIGS. 1 to 3, the other modes of embodiment shown in FIGS. 4 to 6 being respective applications of said device. Thus, FIGS. 1 to 3 show how the quick connection and disconnection device 1 of the invention comprises a nozzle body 2 and a connecting body 3 which can be coupled together and are preferably obtained by injection of plastic material.

The nozzle body 2 is of generally cylindrical shape and includes a cylindrical axial attaching extension 4. To the exterior, the attaching extension 4 has two equal perimetric attaching grooves, a first connection attaching groove 5 and a second disconnection attaching groove 6. Both grooves 5, 6 have a cross section of generally U-shaped outline and are at a relatively short distance from each other, while the wall 7 which separates them has a cross section of convex-curved outline. To the interior, the nozzle body 2 has an axial passage 8 in which can be distinguished: a first cylindrical portion or interior portion 9 whose diameter coincides with that of the end of a flexible tube 10; a second intermediate cylindrical portion 11 of larger diameter whose attachment with the interior portion 9 forms a seat 12 designed to support the end of the tube 10 as shown in FIG. 3; a third intermediate truncated-cone portion 13 whose smaller base attaches to the second intermediate cylindrical portion 11; and a fourth cylindrical portion 14 having the same diameter as that of the larger base of the intermediate truncated-cone portion 13 which forms an opening 15 of the attaching extension 4. The second intermediate cylindrical portion 11 has a perimetric groove 16 in which there is a leaktightness O-ring 17.

The connecting body 3 is of generally hollow cylindrical shape open at one of its ends, marked with reference number 18, while its other end, the closed end 19, has an axial passage 20 through which the end of the tube 10 can slide in both directions, as shown in FIG. 2. The connecting body 3 has on its open end 18 and starting from its edge 21, four equal grooves 22 running longitudinally and regularly distributed which form corresponding attachment arms 23 to the interior of which are respective attachment projections 24, so designed that they can be housed with a snug fit in the connection 5 or disconnection 6 attachment groove 5 of the nozzle body 2. On its other end, the closed end 19, and mounted to the interior and tangentially with respect to the axial passage 20, there are four equal fixing arms 25 on the respective free ends of which there is an interior-oriented fixing projection 26.

The functioning of the quick connection and disconnection device 1 of the invention described as an example of embodiment is now described. The device 1 is supplied ex-works as shown in FIG. 1; with the nozzle 2 and connecting 3 bodies attached in such a way that the four attachment projections 24 of the attaching arms 23 of the connecting body 3 attached in such a way that the four attaching projections 24 of the attaching arms 23 of the connecting body 3 are fitted into the disconnection attaching groove 6 of the attaching groove 4 of the nozzle body 2, thus preventing the possibility of the two bodies 2, 3, by elastic reaction of the attaching arms 23, accidentally separating under normal conditions of use. To connect one end of flexible tube 10 to the device 1, the user simply has to slide the end of the tube 10 in the direction marked A in FIG. 2 through the axial passages 20, 8 of the connecting 3 and nozzle 2 bodies, respectively, until said tube end 10 rests on the seat 12 of the nozzle body 2. The user then has to move the connecting body 3 in the direction marked A so that, by a double elastic deformation of the attaching arms 23, the attaching projections 24 fit into the connection attaching groove 5 of the nozzle body 2; simultaneously, the fixing arms 25 slide on the intermediate truncated-cone portion 13, bringing closer to each other the fixing projections 26 which press on the tube end 10, as shown in FIG. 3, thus leaving the device 1 fixed. Where for any reason the tube end 10 has to be disconnected from the device 1, the user has to move the connecting body 3 in the direction marked B in FIG. 2 in such a way that, by a double elastic deformation of the attaching arms 23, the attaching projections 24 fit into the disconnection attaching groove 6; simultaneously, and by elastic reaction, the fixing arms 25 slide on the truncated-cone portion 13 and separate from each other, so that the fixing projections 26 cease to exercise pressure on the tube end 10, which is released and can then be detached from the device 1 by sliding it in direction B through the axial passages 8, 20, leaving the device 1 in the initial conditions described above.

FIG. 4 shows another mode of embodiment of the quick connection and disconnection device of the invention, which differs from the mode of embodiment shown in FIGS. 1 to 3 in that the nozzle body 2 includes a tubular axial extension 27 which links hydraulically with the forcing chamber 28 of an electric sucking and forcing pump 29.

FIG. 5 shows another mode of embodiment of the quick connection and disconnection device of the invention, which differs from the mode of embodiment shown in FIGS. 1 to 3 in that the nozzle body 2 includes a tubular axial extension 30 which links with a nozzle body 2 of another device of the invention, all this so designed as to render possible the hydraulic connection of two tube ends 10.

FIG. 6 shows another mode of embodiment of the quick connection and disconnection device of the invention, which differs from the mode of embodiment shown in FIGS. 1 to 3 in that it includes a tubular axial extension 31 which links with a jet body 32 to establish hydraulic communication between one tube end 10 and means 33 of cleaning liquid projection.

The connecting body 3 of the modes of embodiment of the quick connection and disconnection device of the invention shown in FIGS. 4, 5 and 6 includes a handgrip projection 34 to assist the user in connection and disconnection operations on a tube end 10, as explained above.

What is claimed is:

1. A quick connection and disconnection device for the electrical pumps and tubes of automobile vehicle wind screen washer installations, comprising a nozzle body and a connecting body each having an axial passage and arranged coaxially relative to one another, said nozzle body and said connecting body being slidable longitudinally in both directions relative to one another so that said connecting body has a first working position which is a disconnection position in which at least one end of a flexible tube passing through said axial passage of said connecting body fits into said axial passage of said nozzle body, and a second working position which is a connection position in which said one end of said flexible tube is attached securely to said nozzle body, said nozzle body being provided on an exterior with a connection groove and a disconnection groove which are separated by a wall of a convex-curved outline, said connecting body at one end being provided with a plurality of longitudinal grooves which starting from an edge of said one end form attachment arms provided internally with attachment projections adapted to be housed with a snug fit in said connection groove or in said disconnection groove of said nozzle body, so that a passage of said connecting body from said disconnection position to said connection position and vice versa, is carried out by a double elastic deformation of said attachment arms.

2. A quick connection and disconnection device as defined in claim 1, wherein said axial passage of said nozzle body has a first cylindrical portion which is a interior portion with a diameter coinciding with a diameter of an interior of said one end of said flexible tube, a second intermediate cylindrical portion having a larger diameter than said diameter of said interior portion so as to form between said second intermediate cylindrical portion and said interior portion a seat on which said one end of said flexible tube can lean, a third intermediate truncated-cone portion with a smaller base connected to said intermediate cylindrical portion, and a fourth cylindrical portion connected to a larger base of said third intermediate truncated-cone portion to form an opening mouth, said connecting body having in an interior a plurality of fixing arms which are arranged tangentially with respect to said axial passage of said connecting body, being equal to one another and being regularly distributed, said fixing arms in an interior of there free ends being provided with a fixing projection, said fixing arms being formed so that during a passage of said connecting body from said disconnecting position to said connecting position and vice versa, an elastic deformation of said fixing arms is produced when said elastic arms slide over said intermediate truncated-cone portion of said nozzle body.

3. A quick connection and disconnection device as defined in claim 1, wherein said nozzle body and said second intermediate cylindrical portion of said axial passage are provided with a perimetric groove; and further comprising a seal arranged in said perimetric groove and providing a lip tightness of the device.

4. A quick connection and disconnection device as defined in claim 1, wherein at least one of said attachment arms of said connecting body has a hand grip connection.

5. A quick connection and disconnection device as defined in claim 1, wherein said nozzle body has a tubular axial extension adapted to be tangentially linked hydraulically with a forcing chamber of an electric pump.

6. A quick connection and disconnection device as defined in claim 1, and further comprising another nozzle body, said first mentioned nozzle body having a tubular axial extension by which it is attached to said other nozzle body so as to permit a hydraulic connection of two ends of flexible tubes.

7. A quick connection and disconnection device as defined in claim 1, wherein said nozzle body has a tubular axial extension which is linkable to a jet body.

* * * * *